US008855039B2

(12) United States Patent
Lin et al.

(10) Patent No.: US 8,855,039 B2
(45) Date of Patent: Oct. 7, 2014

(54) METHOD, SYSTEM AND DEVICE FOR CHANNEL CONTENT ALTERNATION NOTIFICATION AND CHANNEL RE-DETECTING

(75) Inventors: Yanan Lin, Beijing (CN); Xiaodong Yang, Beijing (CN); Xueming Pan, Beijing (CN); Guojun Xiao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 112 days.

(21) Appl. No.: 13/387,719

(22) PCT Filed: Jul. 28, 2010

(86) PCT No.: PCT/CN2010/001144
§ 371 (c)(1),
(2), (4) Date: Jan. 27, 2012

(87) PCT Pub. No.: WO2011/011975
PCT Pub. Date: Feb. 3, 2011

(65) Prior Publication Data
US 2012/0127913 A1 May 24, 2012

(30) Foreign Application Priority Data

Jul. 28, 2009 (CN) .......................... 2009 1 0089912

(51) Int. Cl.
*H04W 4/06* (2009.01)
*H04H 20/71* (2008.01)
*H04W 68/00* (2009.01)
*H04W 72/00* (2009.01)
*H04W 24/00* (2009.01)

(52) U.S. Cl.
CPC ................ *H04W 68/00* (2013.01); *H04W 4/06* (2013.01); *H04W 72/00* (2013.01); *H04W 24/00* (2013.01)
USPC ........................................................ 370/312

(58) Field of Classification Search
CPC ....... H04W 68/00; H04W 4/06; H04W 72/00; H04W 24/00
USPC .......................................................... 370/312
See application file for complete search history.

(56) References Cited

U.S. PATENT DOCUMENTS 8,401,542 B2 3/2013 Chung et al.
2008/0233974 A1* 9/2008 Xu ................................ 455/458
(Continued)

FOREIGN PATENT DOCUMENTS

CN 1756231 A 4/2006
CN 101272601 A 9/2008
(Continued)

OTHER PUBLICATIONS

Alcatel-Lucent Shanghai Bell, Alcatel-Lucent "R2-093095 Notification mechanism design for eMBMS" 3GPP TSG-RAN WG2 #66 San Francisco, US, May 4-8, 2009.*
(Continued)

*Primary Examiner* — Mark Rinehart
*Assistant Examiner* — Kenneth P Hunt
(74) *Attorney, Agent, or Firm* — Blakely, Sokoloff, Taylor & Zafman LLP.

(57) ABSTRACT

A method for channel content alternation notification and channel re-detecting is provided. The method is: a base station determines that the configured carried content of multimedia broadcast multicast service (MBMS) point to multipoint control channel (MCCH) is altered, and transmits the notification about alternation of the carried content of MCCH to a terminal through a physical downlink control channel (PDCCH); the terminal re-detects MCCH according to the notification after the terminal received the notification. A system and a device for channel re-detecting are provided. The terminal can recognize whether the carried content of MCCH is altered, and re-detect MCCH in case of altered without re-detecting MCCH periodically, therefore it is beneficial to save the resources of terminal.

19 Claims, 4 Drawing Sheets

(56) References Cited

U.S. PATENT DOCUMENTS

| | | | |
|---|---|---|---|
| 2010/0275083 A1* | 10/2010 | Nam et al. | 714/748 |
| 2011/0083066 A1* | 4/2011 | Chung et al. | 714/807 |
| 2012/0044826 A1* | 2/2012 | Wang et al. | 370/252 |
| 2012/0127913 A1* | 5/2012 | Lin et al. | 370/312 |
| 2012/0188930 A1* | 7/2012 | Mao et al. | 370/312 |
| 2013/0215761 A1* | 8/2013 | Xu et al. | 370/241 |

FOREIGN PATENT DOCUMENTS

| | | |
|---|---|---|
| CN | 101499882 A | 8/2009 |
| WO | WO 2009/001594 A1 | 12/2008 |

OTHER PUBLICATIONS

LG Electronics Inc. "R2-074246 Discussion on MCCH Update" 3GPP TSG-RAN WG2 #59bisShanghai, China Oct. 8-12, 2007.*

Nokia Siemens Networks, Nokia Corporation "R2-080205 MCCH change notification" 3GPP TSG-RAN WG2 Meeting #60bis Sevilla, Spain Jan. 14-18, 2008.*

Huawei et. al., "R1-100747 MCCH change notification using DCI format 1C," 3GPP TSG-RAN-WG1 Meeting #59bis Valencia, Spain, Jan. 18-22, 2010.*

LG Electronics Inc., "R2-094579 Forward Compatibility for MCCH," 3GPP TSG-RAN WG2 #67 Shenzhen, China, Aug. 24-28, 2009.*

ITRI, "R2-094897 MCCH Change Indicator for UEs Receiving a Session," 3GPP TSG-RAN WG2 Meeting #67 ShenZhen, China Aug. 24-28, 2009.*

CMCC, "R2-100381 Clarification on the MCCH change notification," 3GPP TSG-RAN2 Meeting #68bis Jan. 18-22, 2010, Valencia, Spain.*

Huawei et.al., "R1-100748 MCCH change notification using DCI format 1C," 3GPP TSG-RAN1 Meeting #59bis Valencia, Spain, Jan. 18-22, 2010.*

Ericsson, ST-Ericsson, "R2-094507 Notification mechanism for multiple MCCHs," 3GPP TSG-RAN WG2 #67, Shenzhen, China, Aug. 24-28, 2009.*

Ericsson, "R2-074048Scheduling request triggering criterions for LTE," 3GPP TSG-RAN WG2 #59bis Shanghai, China, Oct. 8-12, 2007.*

LG Electronics Inc. "R2-092227 MBMS Notification" 3GPP TSG-RAN WG2 #65bis Seoul, Korea, Mar. 23-27, 2008.*

Alcatel-Lucent Shanghai Bell, Alcatel-Lucent "R2-093095 Notification mechanism design for eMBMS" 3GPP TSG-RAN WG2 V #66 San Francisco, US, May 4-8, 2009.*

LG Electronics Inc. "R2-074246 Discussion on MCCH Update" 3GPP TSG-RAN WG2 #59bisShanghai, China 8th-12th W Oct. 2007.*

Nokia Siemens Networks, Nokia Corporation "R2-080205 MCCH change notification" 3GPP TSG-RAN WG2 Meeting #60bis X Sevilla, Spain Jan. 14-18, 2008.*

Huawei, "R2-092960 MCCH change notification and termination" 3GPP TSG-RAN2 Meeting #66 San Francisco, USA May 4-8, 2009.*

Huawei et. al., "R1-100747 MCCH change notification using DCI format 1C," 3GPP TSG-RAN-WG1 Meeting #59bis Valencia, V Spain, Jan. 18-22, 2010.*

PCT International Search Report for PCT Counterpart Application No. PCT/CN2010/001144 containing Communication relating to the Results of the International Search Report, 6 pgs., (Nov. 4, 2010).

LG Electronics Inc. "R2-092227 MBMS Notification" 3GPP TSG-RAN WG2 #65bis Seoul, Korea, Mar. 23-27, 2008, 2 pages.

Alcatel-Lucent Shanghai Bell, Alcatel-Lucent "R2-093095 Notification mechanism design for eMBMS" 3GPP TSG-RAN WG2 #66 San Francisco, US, May 4-8, 2009, pp. 1-3.

LG Electronics Inc. "R2-074246 Discussion on MCCH Update" 3GPP TSG-RAN WG2 #59bisShanghai, China Oct. 8-12, 2007, pp. 1-2.

Nokia Siemens Networks, Nokia Corporation "R2-080205 MCCH change notification" 3GPP TSG-RAN WG2 Meeting #60bis Sevilla, Spain Jan. 14-18, 2008, 3 pages.

Huawei, "R2-092960 MCCH change notification and termination" 3GPP TSG-RAN2 Meeting #66 San Francisco, USA May 4-8, 2009, 5 pages.

Huawei et. al., "R1-100747 MCCH change notification using DCI format 1C," 3GPP TSG-RAN-WG1 Meeting #59bis Valencia, Spain, Jan. 18-22, 2010, 4 pages.

LG Electronics Inc., "R2-094579 Forward Compatibility for MCCH," 3GPP TSG-RAN WG2 #67 Shenzhen, China, Aug. 24-28, 2009, 3 pages.

ITRI, "R2-094897 MCCH Change Indicator for UEs Receiving a Session," 3GPP TSG-RAN WG2 Meeting #67 ShenZhen, China Aug. 24-28, 2009, 3 pages.

CMCC, "R2-100381 Clarification on the MCCH change notification," 3GPP TSG-RAN2 Meeting #68bis Jan. 18-22, 2010, Valencia, Spain, 3 pages.

Huawei et.al., "R1-100748 MCCH change notification using DCI format 1C," 3GPP TSG-RAN1 Meeting #59bis Valencia, Spain, Jan. 18-22, 2010, 3 pages.

Ericsson, ST-Ericsson, "R2-094507 Notification mechanism for multiple MCCHs," 3GPP TSG-RAN WG2 #67, Shenzhen, China, Aug. 24-28, 2009, 4 pages.

Ericsson, "R2-074048Scheduling request triggering criterions for L TE," 3GPP TSG-RAN WG2 #59bis Shanghai, China, Oct. 8-12, 2007, 3 pages.

Written Opinion of the International Search Authority for PCT/CN2011/079745 with full English translation, 10 pgs. (Dec. 29, 2011).

PCT Notification of Transmittal of International Preliminary Report on Patentability for PCT Application No. PCT/CN2011/079745 with full English translation, 12 pgs. (Mar. 19, 2013).

* cited by examiner

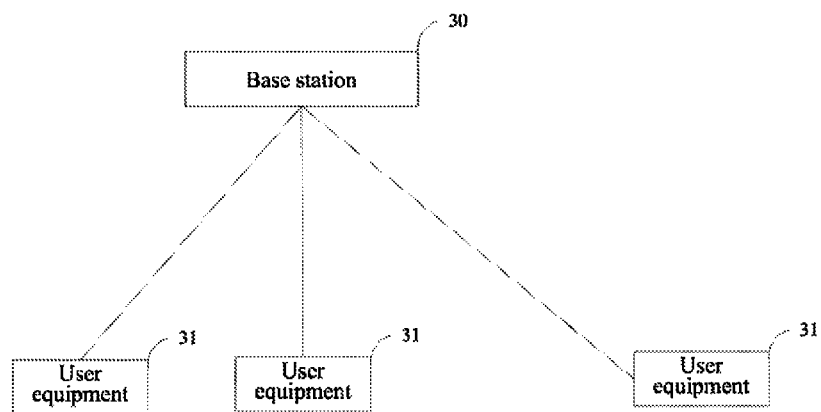

METHOD, SYSTEM AND DEVICE FOR CHANNEL CONTENT ALTERNATION NOTIFICATION AND CHANNEL RE-DETECTING

CROSS REFERENCE TO RELATED APPLICATIONS

The present application is a US National Stage of International Application No. PCT/CN2010/001144, filed 28 Jul. 2010, designating the United States, and claiming priority to Chinese Patent Application No. 200910089912.X filed 28 Jul. 2009.

FIELD

The present invention relates to the field of radio communications and particularly to a method, system and device for channel content change notification and channel redetection.

BACKGROUND

A Multimedia Broadcast and Multicast Service (MBMS) serves to provide multimedia broadcast and multicast services for users in a radio cell. In a Long Term Evolution (LTE) system, the MBMS can be provided at both an MBMS dedicated frequency layer and a frequency layer which is not shared for MBMS services. The MBMS dedicated frequency layer refers to a frequency layer dedicated to MBMS transmission. A cell configured as an MBMS dedicated frequency layer is referred to as an MBMS dedicated cell, and a cell configured as a frequency layer which is not dedicated to MBMS transmission is referred to as a hybrid MBMS/unicast cell. Unicast and MBMS services in the hybrid MBMS/unicast cell are subject to coordinated transmission in which some instances of time are used for MBMS service transmission and the other instances of time are used for unicast service transmission.

MBMS transmission can be divided into multi-cell transmission and uni-cell transmission. MBMS uni-cell transmission refers to point-to-multipoint (PTM) MBMS transmission only in the coverage area of a specified cell and supports no combination of MBMS transmission from a plurality of cells; and MBMS multi-cell transmission has to support transmission over a Multicast Broadcast Single Frequency Network (MBSFN), that is, consistent signals are transmitted concurrently in a plurality of cells.

MBMS related logical channels include a Multicast Traffic Channel (MTCH) and MBMS point-to-multipoint Control Channel (MCCH), where:

The MTCH is a point-to-multipoint downlink channel on which MBMS traffic data is transmitted from a network to a User Equipment (UE), and this channel is available only to a UE capable of receiving MBMS services. Information of the MTCH is indicated by its corresponding MCCH. The MCCH is indicated to the UE on a Broadcast Control Channel (BCCH) and further the MTCH is indicated to the UE on the MCCH from the network so that the UE receives MBMS services carried on the MTCH.

The MCCH is a point-to-multipoint downlink channel on which MBMS control information is transmitted from a network to a UE, and one MCCH controls one or more MTCHs. The MCCH can be read only by a UE receiving MBMS services. The MCCH is mapped onto an MCH in the case of MBSFN transmission and onto a Downlink Supplementary Channel (DL-SCH) in the case of non-MBSFN transmission.

Radio Network Temporary Identifiers (RNTIs) in the existing system are divided into two categories: one category is cell-specific RNTIs, e.g., a Paging RNTI (P-RNTI), a System Information RNTI (SI-RNTI), etc., and Downlink Control Information (DCI) or common signaling corresponding to common information to be read by all the users in a cell is scrambled with this category of RNTIs and then transmitted in a common search space of a Physical Downlink Control Channel (PDCCH); and the other category is user-specific RNTIs, e.g., a cell RNTI (C-RNTI), etc., i.e., a serial number of each UE at the MAC layer, and control information or dedicated signaling corresponding to user-specific data information is scrambled with this category of RNTIs and then transmitted in a user-specific search space of the PDCCH. Upon reception of the control information, a user can know whether the control information is intended for the user simply by detecting the RNTI used for scrambling.

Upon reception of the PDCCH, the user can not be aware of a specific format in which a base station transmits the downlink control information and therefore has to perform blind detection of the DCI format, that is, the user has to decode the signaling respectively with different lengths of information and levels of CCE aggregation defined in the system and determine from a CRC check whether the signaling is received correctly.

The inventors have identified during making of the invention the following technical problem present in the prior art;

The MTCH related control information is transmitted periodically on the MCCH, and the contents of the control information carried on the MCCH are configured quasi-statically and less variable. The UE listens periodically to the MCCH, and the same contents of the control information received on the MCCH may be duplicated, thereby resulting in a resource waste.

SUMMARY

Embodiments of the invention provide a channel content change notification method and a base station to address the problem in the prior art that a UE can not be aware of whether contents carried on an MCCH are changed.

A channel content change notification method includes:

a base station determining whether contents carried on a configured Multimedia Broadcast and Multicast Service, MBMS, point-to-multipoint Control Channel, MCCH, or MCCHs are changed; and the base station transmitting a notification about a change of the contents carried on the MCCH or MCCHs to a user equipment on a Physical Downlink Control Channel, PDCCH.

A base station includes:

a change determination unit configured to determine whether contents carried on a configured Multimedia Broadcast and Multicast Service, MBMS, point-to-multipoint Control Channel, MCCH, are changed; and a change notification unit configured to transmit a notification about a change of the contents carried on the MCCH to a user equipment on a Physical Downlink Control Channel, PDCCH, after the change determination unit determines the change of the contents carried on the MCCH.

Embodiments of the invention further provide a channel redetection method, a channel redetection system and a user equipment to conserve a resource required for the user equipment to listen to a channel.

A channel redetection method includes:

a user equipment receiving a notification about a change of contents carried on an Multimedia Broadcast and Multicast Service, MBMS, point-to-multipoint Control Channel, MCCH, transmitted from a base station on a Physical Downlink Control Channel, PDCCH; and the user equipment redetecting the MCCH according to the notification.

A channel redetection system includes:

a base station configured to transmit a notification about a change of contents carried on a configured Multimedia Broadcast and Multicast Service, MBMS, point-to-multipoint Control Channel, MCCH, to a user equipment on a Physical Downlink Control Channel, PDCCH, after determining the change of the contents carried on the MCCH; and the user equipment configured to receive the notification on the PDCCH and to redetect the MCCH according to the notification.

A user equipment includes:

a change notification reception unit configured to receive a notification about a change of contents carried on an Multimedia Broadcast and Multicast Service, MBMS, point-to-multipoint Control Channel, MCCH, transmitted from a base station on a Physical Downlink Control Channel, PDCCH; and a channel redetection unit configured to redetect the MCCH according to the notification.

In the invention, a base station determines a change of contents carried on a configured MCCH and transmits a notification about the change of the contents carried on the MCCH to a user equipment on a PDCCH, and the user equipment redetects the MCCH according to the received notification upon reception of the notification on the PDCCH. The base station notifies the user equipment about the change of the contents carried on the MCCH so that the UE can be aware of whether the contents carried on the MCCH is changed and redetect the MCCH only if there is a change instead of redirecting the MCCH periodically, thereby avoiding unnecessary listening of the UE to the MCCH and facilitating conservation of a resource required for the user equipment to listening to the channel.

BRIEF DESCRIPTION OF THE DRAWINGS

FIG. 2A is an illustrative diagram of a format of DCI according to an embodiment of the invention;

FIG. 2B is an illustrative diagram of another format of DCI according to an embodiment of the invention;

FIG. 3 is a schematic structural diagram of a system according to an embodiment of the invention;

DETAILED DESCRIPTION

In order to address the problem in the prior art of a resource waste resulting from a UE listening periodically to an MCCH, embodiments of the invention provide a channel content change notification and channel redetection method in which a base station transmits an MCCH carried content change notification to a user equipment after determining a change of contents carried on a configured MCCH and the user equipment redetects the MCCH according to the notification.

Figure 1:
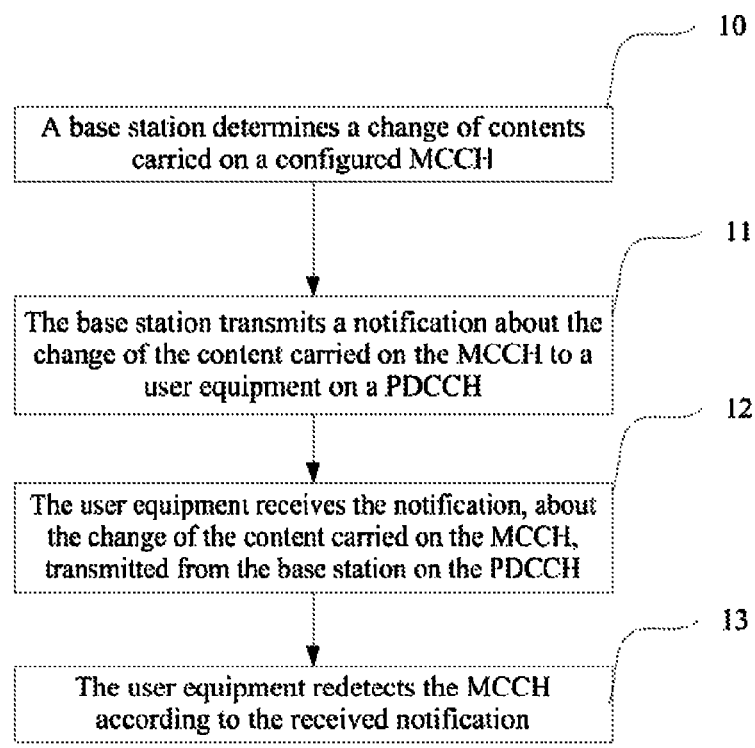
FIG. 1 is a schematic flow chart of a method according to an embodiment of the invention.

Referring to FIG. 1, a channel content change notification and channel redetection method according to an embodiment of the invention particularly includes the following operations 10 to 13.

Operation 10: A base station determines a change of contents carried on a configured MCCH;

Operation 11: The base station transmits a notification about the change of the content carried on the MCCH to a user equipment on a Physical Downlink Control Channel (PDCCH);

Operation 12: The user equipment receives the notification, about the change of the content carried on the MCCH, transmitted from the base station on the PDCCH; and Operation 13: The user equipment redetects the MCCH according to the received notification.

In the operation 11, the base station can transmit the notification to the user equipment particularly in the following two implementations:

In a First Implementation:

Firstly the base station generates first Downlink Control Information (DCI) to notify about the change of the contents carried on the MCCH;

Then the first DCI is scrambled with a predefined first Radio Network Temporary Identifier (RNTI) corresponding to the first DCI; and Finally the scrambled first DCI is transmitted to the user equipment on the PDCCH.

In a Second Implementation:

Firstly the base station generates second DCI corresponding to a cell-specific second RNTI in an LTE system;

Then the second DCI is scrambled with a predefined first RNTI and the second RNTI; and Finally the scrambled second DCI is transmitted to the user equipment on the PDCCH.

The second RNTI is a cell-specific RNTI already existing in the LTE system, including a P-RNTI, an SI-RNTI, a Random Access RNTI (RA-RNTI), etc.

The base station can generate the first DCI particularly in the following two implementations:

In a first implementation, the base station selects a preset bit length according to the number of MCCH(s) with changed carried contents or both the number of MCCH(s) with changed carried contents and the changed carried contents on the MCCH(s) and generates a DCI with the bit length as the first DCI.

In a second implementation, the base station selects a DCI format already used in the LTE system according to the number of MCCH(s) with a change of carried contents or both the number of MCCH(s) with changed carried contents and the changed carried contents on the MCCH(s) and generates a DCI with the same bit length as the bit length of the DCI format as the first DCI. DCI formats already used in the LTE system include the formats 1A/1C/3/3A, etc., for transmission in a common search space of the PDCCH.

In the first implementation, there are numerous methods for generating the first DCI, which will be described below by way of examples:

In a first example, a DCI with a 1-bit length is generated as the first DCI when there is one MCCH with a change of carried contents.

In a second example, when there is one MCCH with a change of carried contents and the changed contents carried on the MCCH are required to be carried in the first DCI, a DCI with a bit length which is not less than a bit length required to represent the changed carried contents is generated as the first DCI, and the changed contents carried on the MCCH and also possibly information indicating whether the first DCI carries all the changed contents carried on the MCCH are carried in the first DCI.

In a third example, when there are multiple MCCHs with a change of carried contents, a DCI with an N-bit length is generated as the first DCI; and for each of the MCCHs, the value of the corresponding bit of the first DCI to the MCCH is set to data indicating the change of the contents carried on the MCCH, where N is the number of MCCHs included in a cell covered by the base station.

In a fourth example, when there are multiple MCCHs with a change of carried contents and the changed contents carried on the MCCHs are required to be carried in the first DCI, a DCI including a number N of data segments is generated as the first DCI; and for each of the MCCHs, the value of a set bit in the corresponding data segment in the first DCI to the MCCH is set to data indicating the change of the contents carried on the MCCH; and the changed contents carried on the MCCH are carried in the other bits in the data segment, and also information indicating whether the data segment carries all the changed contents carried on the MCCH can be carried in the data segment.

In the foregoing second implementation, there are also numerous methods for generating the first DCI, which will be described below by way of examples:

In a first example, a DCI format with the least bit length already existing in the LTE system is selected and a DCI with the same bit length as the bit length of the DCI format is generated as the first DCI when there is one MCCH with a change of carried contents.

In a second example, when there is one MCCH with a change of carried contents and the changed contents carried on the MCCH are required to be carried in the first DCI, a DCI format already existing in the LTE system with a bit length which is not less than a bit length required to represent the changed carried contents is selected, and a DCI with the same bit length as the bit length of the DCI format is generated as the first DCI; and the changed contents carried on the MCCH and also possibly information indicating whether the first DCI carries all the changed contents carried on the MCCH are carried in the first DCI.

In a third example, when there are multiple MCCHs with a change of carried contents, a DCI format already existing in the LTE system with a bit length which is not less than N bit is selected, and a DCI with the same bit length as the bit length of the DCI format is generated as the first DCI; and for each of the MCCHs, the value of the corresponding bit of the first DCI to the MCCH is set to data indicating the change of the contents carried on the MCCH, where N is the number of MCCHs included in a cell covered by the base station.

In a fourth example, when there are multiple MCCHs with a change of carried contents and the changed contents carried on the MCCHs are required to be carried in the first DCI, a DCI format already existing in the LTE system with a bit length, which is not less than a bit length of N data segments, is selected, and a DCI with the same bit length as the bit length of the DCI format is generated as the first DCI; and for each of the MCCHs, the value of a set bit in the corresponding data segment in the first DCI to the MCCH is set to data indicating the change of the contents carried on the MCCH; and the changed contents carried on the MCCH are carried in the other bits in the data segment, and also information indicating whether the data segment carries all the changed contents carried on the MCCH can be carried in the data segment.

The base station can scramble the second DCI with the first RNTI and the second RNTI particularly in numerous implementations. In an example, a mathematical operation can be performed on the first RNTI and the second RNTI to derive a third RNTI, and the second DCI can be scrambled with the third RNTI. In another example, the second DCI can be scrambled once respectively with the first RNTI and the second RNTI. In the invention, the mathematical operation on the first RNTI and the second RNTI can be an exclusive OR operation, an addition operation, a subtraction operation, etc.

It shall be noted that the base station shall reserve the third RNTI, that is, the base station can know a specific value of the third RNTI and shall not allocate the third RNTI to any user equipment for use after allocating the first RNTI and the second RNTI.

In the invention, the base station can transmit the notification anytime after determining the change of the contents carried on the MCCH. For example, the base station can determine, from a preset first correspondence relationship between MCCH identifiers and notification transmission times, a notification transmission time corresponding to the identifier of the MCCH with the change of the carried contents and transmit the first DCI or the second DCI at the notification transmission time. Of course this implementation can only be applicable to a scenario in which one first DCI notifies about a change of contents carried on one MCCH.

In the invention, the first RNTI can include only one RNTI, that is, the base station scrambles the first DCI uniformly with the RNTI.

The first RNTI can alternatively include multiple RNTIs, that is, each MCCH included in a cell covered by the base station corresponds to one first RNTI. Particularly a second correspondence relationship between MCCH identifiers and RNTIs is preset, and for transmission of the first DCI to notify about a change of contents carried on a specific MCCH, the base station firstly determines an RNTI corresponding to the identifier of the MCCH according to the second correspondence relationship and scrambles the first DCI with the RNTI. Of course this implementation can only be applicable to a scenario in which one first DCI notifies about a change of contents carried on one MCCH.

In the operation 12, the user equipment can also receive the notification, about the change of the content carried on the MCCH, transmitted from the base station on the PDCCH in the following two implementations:

In a First Implementation:

Firstly the user equipment receives the DCI on the PDCCH; and

Then the user equipment detects whether the RNTI used for scrambling the received DCI is the first RNTI, and if so, then it is determined that the received DCI is the first DCI to notify about the change of the contents carried on the MCCH.

In a Second Implementation:

Firstly the user equipment receives the Downlink Control Information, DCI, on the PDCCH; and Then the user equipment detects whether the DCI is scrambled with the first RNTI and with the cell-specific second RNTI in the LTE system, and if so, then it is determined that the received DCI is the second DCI corresponding to the second RNTI, and the second DCI is taken as notification signaling of the change of the contents carried on the MCCH. It shall be noted that the second DCI has its original function still active and additionally notifies about the change of the contents carried on the MCCH in the invention.

The user equipment can detect whether the received DCI is scrambled with the first RNTI and the second RNTI particularly in the following two implementations:

In a first implementation, it is determined whether the RNTI used for scrambling the received DCI is the third RNTI which is the RNTI derived from the mathematical operation on the first RNTI and the second RNTI, and if so, then it is determined that the DCI is scrambled with the first RNTI and the second RNTI.

In a second implementation, it is determined whether the received DCI is scrambled once respectively with the first RNTI and the second RNTI, and if so, then it is determined that the DCI is scrambled with the first RNTI and the second RNTI.

In correspondence to the different implementations in which a base station generates a first DCI or a second DCI, a user equipment can redetect an MCCH with the received first DCI or second DCI in numerous implementations, which will be described below by way of examples.

In a first example, an MCCH identifier, corresponding to the time that a first DCI or a second DCI is received, is determined according to the foregoing preset first correspondence relationship, and an MCCH corresponding to the MCCH identifier is redetect.

In a second example, an MCCH identifier corresponding to an RNTI used for scrambling a received first DCI or second DCI is determined according to the foregoing preset second correspondence relationship, and an MCCH corresponding to the MCCH identifier is redetect.

In a third example, an MCCH identifier corresponding to the location of a bit with a set value in a first DCI is determined according to a preset third correspondence relationship between locations of bits and MCCH identifiers, and an MCCH corresponding to the MCCH identifier is redetect.

In a fourth example, for each data segments included in a received first DCI, if the value of a set bit in the data segment is a set value, then an MCCH identifier corresponding to the location of the data segment is determined according to a preset fourth correspondence relationship between locations of data segments and MCCH identifiers, and an MCCH corresponding to the MCCH identifier is redetect.

Preferably, before the user equipment redetects the MCCH according to a notification, the user equipment determines whether the notification carries all the changed contents carried on the MCCH and redetects the MCCH upon determining that the notification does not carry all the changed contents carried on the MCCH. Here the user equipment can determine whether the notification carries all the changed contents carried on the MCCH according to the value of a specific bit of the first DCI. For example, when the first DCI notifies about a change of contents carried on one MCCH, it is determined whether a second bit of the first DCI is 1, and if so, then it is determined that the notification carries all the changed contents carried on the MCCH; or when the first DCI notifies about a change of contents carried on multiple MCCHs, it is determined whether a second bit of a specific data segment in the first DCI is 1, and if so, then it is determined that the notification carries all the changed contents carried on the MCCH corresponding to the data segment.

The method according to the invention will be described below in particular embodiments.

The First Embodiment

In this embodiment, a base station transmits a notification about a change of contents carried on an MCCH in a DCI with a preset bit length and scrambled with an M-RNTI and then transmits the DCI in a common search space of a PDCCH. This solution makes an efficient use of the DCI, that is, there are a less number of unused bits of the DCI.

With a 1-bit preset bit length, if the base station notifies about a change of contents carried on only one specific MCCH and a notification does not carry any specific changed contents, then a user equipment can determine the specific MCCH with the change of the carried contents according to a preset first correspondence relationship or second correspondence relationship once the DCI scrambled with the M-RNTI is detected on the PDCCH to thereby redetect the MCCH with the change.

With an N-bit preset bit length, a specific value of N is system preset to the largest number of MCCHs that can be carried in a cell covered by the base station. If a number M of MCCHs are carried in the cell (M≤N), then a number M of preceding bits of the DCI in an order of ID numbers corresponding to the number M of MCCHs can indicate respectively a change of contents carried on the number M of MCCHs, that is, a DCI can indicate whether the contents carried on the number M of MCCHs are changed. Specifically the value of a corresponding bit among the number M of preceding bits of the DCI to an MCCH with a change of carried contents is set "1", and the other bits among the number M of preceding bits are set to "0", leaving the number N-M of remaining bits reserved. The user equipment is aware of the change of the contents carried on the MCCH corresponding to the bit with the value of "1" in the DCI after detecting the DCI scrambled with the M-RNTI on the PDCCH to thereby redetect the MCCH with the change. FIG. 2A illustrates an illustrative diagram of the format of the DCI.

The Second Embodiment

In this embodiment, a base station generates a DCI in a DCI format already existing in the LTE system, transmits a notification about a change of contents carried on an MCCH in the DCI and scrambles the DCI with an M-RNTI and then transmits the DCI in a common search space of a PDCCH. The number of times that a user equipment performs blind detection will not be increased with this solution.

In the LTE Rel-8 system, there are only four formats of DCI available in a common search space, i.e., the formats of 1A/1C/3/3A.

If a base station notifies a change of contents carried on only one specific MCCH and a notification does not carry any specific changed contents, then a user equipment can determine the specific MCCH with the change of the carried contents according to a preset first correspondence relationship or second correspondence relationship once the DCI scrambled with the M-RNTI is detected on the PDCCH to thereby redetect the MCCH with the change. Here respective bits of the DCI can be set arbitrarily, and all of the bits simply can be set to "0" or "1", and here a DCI format with the least bit length among 1A/1C/3/3A can be selected for the efficiency of the DCI.

If a number M of MCCHs are carried in a cell covered by the base station, then a DCI format with a length which is the closest to but not less than M can be selected from the formats of 1A/1C/3/3A, and a number M of preceding bits of the DCI in an order of ID numbers corresponding to the number M of MCCHs can indicate respectively a change of contents carried on the number M of MCCHs, that is, a DCI can indicate whether the contents carried on the number M of MCCHs are changed. Specifically the value of a corresponding bit among the number M of preceding bits of the DCI to an MCCH with a change of carried contents is set "1", and the other bits among the number M of preceding bits are set to "0", leaving the number N-M of remaining bits reserved. The user equipment is aware of the change of the contents carried on the MCCH corresponding to the bit with the value of "1" in the DCI after detecting the DCI scrambled with the M-RNTI on the PDCCH to thereby redetect the MCCH with the change.

If a notification about a change of contents carried on an MCCH carries some common and simple changed contents carried on the MCCH, e.g., an added or deleted program, etc., then the changed carried contents can be carried in the DCI, and here the user equipment can immediately be aware of the specific changed carried contents upon reception of the DCI.

If the base station notifies about a change of contents carried on only one specific MCCH, then a DCI format with a length which is the closest to but not less than the specific length P of the changed carried contents can be selected from 1A/1C/3/3A. A first bit of the DCI indicates whether the DCI carries all the changed contents carried on the MCCH. For example, the first bit is set to "1" indicating that the DCI carries all the changed contents carried on the MCCH or to "0" indicating the DCI does not carry any the changed contents carried on the MCCH or all the changed contents carried on the MCCH. Then the user equipment can determine the specific MCCH with the change of the carried contents according to a preset first correspondence relationship or second correspondence relationship once the DCI scrambled with the M-RNTI is detected on the PDCCH and redetect the MCCH with the change when the first bit of the DCI is "0".

If a number M of MCCHs are carried in a cell covered by the base station, then a DCI format with a length which is not less than the bit length of a number N of data segments is selected from 1A/1C/3/3A, a sequence of bits of a DCI generated in the format is divided into a number N of data segments, and the respective data segments in an order of ID numbers of the MCCHs indicate a change of contents carried on the respective MCCHs. Particularly a first bit of each data segment indicates whether the corresponding MCCH is changed (for example, the first bit is set to "1" indicating a change and to "0" indicating no change), and if there is a change, then the other bits in the data segment can indicate the specific changed contents (see the foregoing description for details thereof), or if there is no change, then the other bits in the data segment are reserved. After detecting the DCI scrambled with the M-RNTI on the PDCCH, for each data segment included in the DCI, the user equipment redetects the MCCH corresponding to the data segment if the value of the first bit of the data segment is "1". FIG. 2B illustrates an illustrative diagram of the format of the DCI.

The Third Embodiment

In this embodiment, a base station transmits a notification about a change of contents carried on an MCCH in an existing DCI corresponding to a P-RNTI and scrambled with an M-RNTI and the P-RNTII and then transmits the DCI in a common search space of a PDCCH.

If a number M of MCCHs are carried in a cell covered by the base station, then the base station shall transmit the DCI corresponding to the P-RNTI for a number M of times, where the length of each piece of DCI is 1 bit and the DCI to be transmitted is scrambled with an X-RNTI resulting from an exclusive OR operation on the M-RNTI and the P-RNTI.

A user equipment can determine a specific MCCH with a change of carried contents according to a preset first correspondence relationship or second correspondence relationship once the DCI scrambled with the X-RNTI is detected on the PDCCH to thereby redetect the MCCH with the change.

Referring to FIG. 3, an embodiment of the invention further provides a channel redetection system including:

A base station 30 configured to transmit a notification about a change of contents carried on a configured MCCH to a user equipment on a PDCCH after determining the change of the contents carried on the MCCH; and The user equipment 31 configured to receive the notification on the PDCCH and to redetect the MCCH according to the notification.

The base station 30 is configured:
to generate a first DCI to notify about the change of the contents carried on the MCCH, to scramble the first DCI with a predefined first RNTI corresponding to the first DCI, and to transmit the scrambled first DCI to the user equipment on the PDCCH.

Correspondingly the user equipment 31 is configured:
to detect whether the RNTI used for scrambling the DCI is the first RNTI upon reception of the DCI on the PDCCH, and if so, then determine that the received DCI is the first DCI.

The base station 30 is configured:
to generate a second DCI corresponding to a cell-specific second RNTI in an LTE system, to scramble the second DCI with a predefined first RNTI and the second RNTI, and to transmit the scrambled second DCI to the user equipment on the PDCCH.

Correspondingly the user equipment 31 is configured:
to receive the DCI on the PDCCH; and to detect whether the DCI is scrambled with the first RNTI and the second RNTI, and if so, then determine that the DCI is the second DCI corresponding to the second RNTI, and take the second DCI as notification signaling of the change of the contents carried on the MCCH.

The base station 30 is configured:
to perform a mathematical operation on the first RNTI and the second RNTI to derive a third RNTI and to scramble the second DCI with the third RNTI; or to scramble the second DCI once respectively with the first RNTI and the second RNTI.

Correspondingly the user equipment 31 is configured:
to determine whether the RNTI used for scrambling the received DCI is the third RNTI or whether the DCI is scrambled once respectively with the first RNTI and the second RNTI, and if so, then determine that the DCI is scrambled with the first RNTI and the second RNTI.

The base station 30 is further configured:
to carry the changed contents carried on the MCCH in the notification.

Correspondingly the user equipment 31 is further configured:
to determine whether the notification carries all the changed contents carried on the MCCH, and if no then redetect the MCCH.

Figure 4:
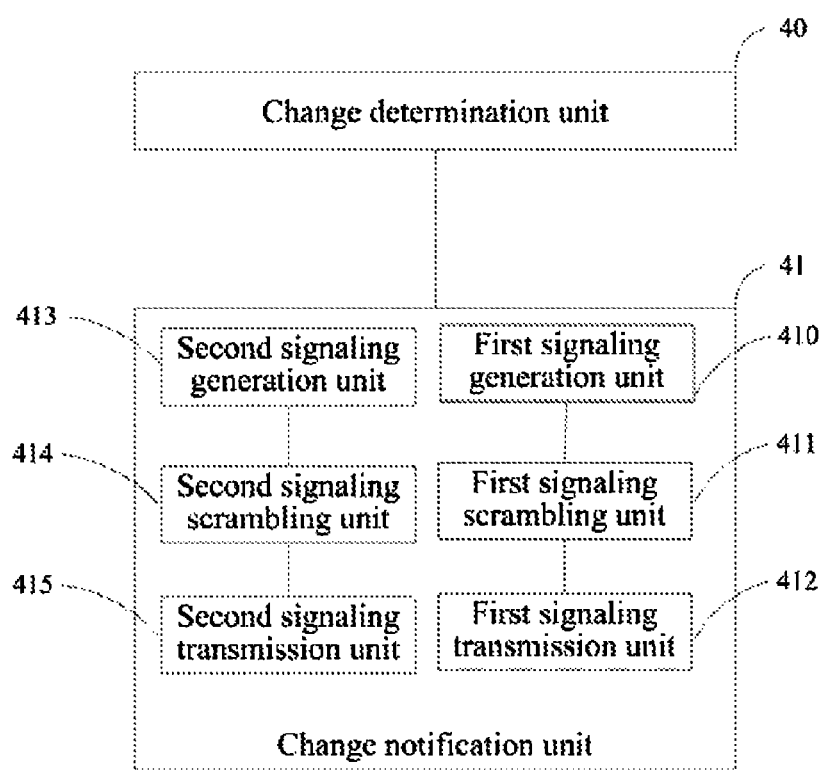
FIG. 4 is a schematic structural diagram of a base station according to an embodiment of the invention.

Referring to FIG. 4, an embodiment of the invention further provides a base station applicable to a channel redetection system, and the base station includes:

A change determination unit 40 configured to determine whether contents carried on a configured MCCH or MCCHs are changed; and A change notification unit 41 configured to transmit a notification about a change of the contents carried on the MCCH or MCCHs to a user equipment on a PDCCH after the change determination unit determines the change of the contents carried on the MCCH or MCCHs.

In an embodiment, the change notification unit 41 includes a first signaling generation unit 410, a first signaling scrambling unit 411 and a first signaling transmission unit 412, wherein:

The first signaling generation unit 410 is configured to generate first Downlink Control Information, DCI, to notify about the change of the contents carried on the MCCH or MCCHs.

The first signaling scrambling unit 411 is configured to scramble the first DCI with a predefined first RNTI corresponding to the first DCI; and The first signaling transmission unit 412 is configured to transmit the first DCI scrambled by the first signaling scrambling unit to the user equipment on the PDCCH.

In another embodiment, the change notification unit 41 includes a second signaling generation unit 413, a second signaling scrambling unit 414 and a second signaling transmission unit 415, wherein:

The second signaling generation unit 413 is configured to generate second DCI corresponding to a cell-specific second RNTI in an LTE system;

The second signaling scrambling unit 414 is configured to scramble the second DCI with a predefined first RNTI and the second RNTI; and The second signaling transmission unit 415 is configured to transmit the second DCI scrambled by the second signaling scrambling unit to the user equipment on the PDCCH.

The second signaling scrambling unit 414 includes a mathematical scrambling unit and/or a serial scrambling unit, where:

The mathematical scrambling unit is configured to perform a mathematical operation on the first RNTI and the second RNTI to derive a third RNTI and to scramble the second DCI with the third RNTI; and The serial scrambling unit is configured to scramble the second DCI once respectively with the first RNTI and the second RNTI.

The first signaling generation unit 410 includes a setting generation unit and/or a selection generation unit, wherein:

The setting generation unit is configured to select one of preset lengths of bits according to the number of MCCH or MCCHs or both the number of MCCH or MCCHs and the changed contents carried on the MCCH or MCCHs, and to generate a DCI with the bit length as the first DCI; and The selection generation unit is configured to select one of DCI formats already existing in an LTE system according to the number of MCCH or MCCHs or both the number of MCCH or MCCHs and the changed contents carried on the MCCH or MCCHs, and to generate a DCI with the same bit length as the bit length of the DCI format as the first DCI.

The setting generation unit includes any one or combination of a first unit, a second unit, a third unit and a fourth unit, wherein:

The first unit is configured to generate a DCI with a 1-bit length as the first DCI when the MCCH or MCCHs is one MCCH;

The second unit is configured to generate a DCI with a bit length, which is not less than a bit length required to represent the changed carried contents, as the first DCI when the MCCH or MCCHs is one MCCH and the changed contents carried on the MCCH are carried in the first DCI;

The third unit is configured to generate a DCI with an N-bit length as the first DCI when the MCCH or MCCHs are multiple MCCHs; and for each of the MCCHs, to set the value of the corresponding bit in the first DCI to the MCCH to data indicating the change of the contents carried on the MCCH, where N is the number of MCCHs included in a cell covered by the base station; and The fourth unit is configured to generate a DCI including a number N of data segments as the first DCI when the MCCH or MCCHs are multiple MCCHs and the changed contents carried on the MCCHs are carried in the first DCI; and for each of the MCCHs, to set the value of a set bit in the corresponding data segment in the first DCI to the MCCH to data indicating the change of the contents carried on the MCCH, and to carry the changed contents carried on the MCCH in the other bits in the data segment.

The selection generation unit includes any one or combination of a fifth unit, a sixth unit, a seventh unit and an eighth unit, where:

The fifth unit is configured to select a DCI format already existing in the LTE system with the least bit length, and to generate a DCI with the same bit length as the bit length of the DCI format as the first DCI when the MCCH or MCCHs is one MCCH;

The sixth unit is configured to select a DCI format already existing in the LTE system with a bit length which is not less than a bit length required to represent the changed carried contents, to generate a DCI with the same bit length as the bit length of the DCI format as the first DIC, and to carry the changed contents carried on the MCCH in the first DCI when the MCCH or MCCHs is one MCCH and the changed contents carried on the MCCH are carried in the first DCI;

The seventh unit is configured to select a DCI format already existing in the LTE system with a bit length which is not less than N bits and generate a DCI with the same bit length as the bit length of the DCI format as the first DCI when the MCCH or MCCHs are multiple MCCHs; and for each of the MCCHs, to set the value of the corresponding bit in the first DCI to the MCCH to data indicating the change of the contents carried on the MCCH, where N is the number of MCCHs included in a cell covered by the base station; and The eighth unit is configured to select a DCI format already existing in the LTE system with a bit length which is not less than the bit length of a number N of data segments and generate a DCI with the same bit length as the bit length of the DCI format as the first DCI when the MCCH or MCCHs are multiple MCCHs and the changed contents carried on the MCCHs are carried in the first DCI; and for each of the MCCHs, to set the value of a set bit in the corresponding data segment in the first DCI to the MCCH to data indicating the change of the contents carried on the MCCH, and to carry the changed contents carried on the MCCH in the other bits in the data segment.

Figure 5:
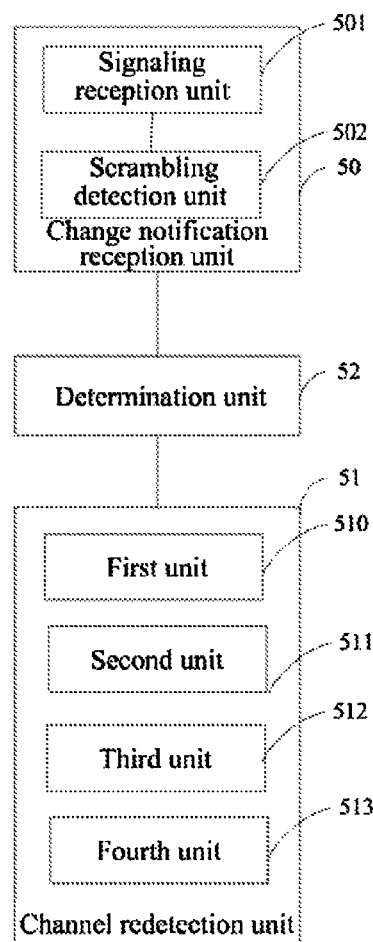
FIG. 5 is a schematic structural diagram of a user equipment according to an embodiment of the invention.

Referring to FIG. 5, an embodiment of the invention further provides a user equipment applicable to a channel redetection system, and the user equipment includes:

A change notification reception unit 50 configured to receive a notification about a change of contents carried on an MCCH transmitted from a base station on a PDCCH; and A channel redetection unit 51 configured to redetect the MCCH according to the notification.

The change notification reception unit 50 includes a signaling reception unit 501 and a scrambling detection unit 502, where:

The signaling reception unit 501 is configured to receive a DCI on the PDCCH; and The scrambling detection unit 502 is configured: to detect whether an RNTI used for scrambling the DCI is a first RNTI, and if so, then determine that the DCI is a first DCI to notify about the change of the contents carried on the MCCH, where the first RNTI is a predefined RNTI corresponding to the first DCI; or to detect whether the DCI is scrambled with the first RNTI and a cell-specific RNTI in an LTE system, and if so, then determine that the DCI is a second DCI corresponding to the second RNTI and take the second DCI as notification signaling for the change of the contents carried on the MCCH.

The scrambling detection unit 502 includes a first detection unit and/or a second detection unit, where:

The first detection unit is configured to determine whether the RNTI used for scrambling the DCI is a third RNTI which is an RNTI resulting from a mathematical operation on the first RNTI and the second RNTI, and if so, then determine that the DCI is scrambled with the first RNTI and the second RNTI; and The second detection unit is configured to determine whether the DCI is scrambled once respectively with the first RNTI and the second RNTI, and if so, then determine that the DCI is scrambled with the first RNTI and the second RNTI.

The channel redirection unit 51 includes any one or combination of a first unit 510, a second unit 511, a third unit 512 and a fourth unit 513, wherein:

The first unit 510 is configured to determine an MCCH identifier corresponding the time that the first DCI or the second DCI is received according to a preset first correspondence relationship between notification transmission times and MCCH identifiers, and to redetect the MCCH corresponding to the MCCH identifier;

The second unit 511 is configured to determine an MCCH identifier corresponding to the RNTI used for scrambling the first DCI or the second DCI according to a preset second correspondence relationship between RNTIs and MCCI identifiers, and to redetect the MCCH corresponding to the MCCH identifier;

The third unit 512 is configured to determine an MCCH identifier corresponding to the location of a bit with a set value in the first DCI according to a preset third correspondence relationship between locations of bits and MCCH identifiers, and to redetect the MCCH corresponding to the MCCH identifier; and The fourth unit 513 is configured to determine for each data segment included in the first DCI an MCCH identifier corresponding to the location of the data segment according to a preset third correspondence relationship between locations of data segments and MCCH identifiers if the value of a set bit in the data segment is a set value, and to redetect the MCCH corresponding to the MCCH identifier.

The user equipment further includes:

A determination unit 52 configured to determine whether the notification carries all the changed contents carried on the MCCH.

Correspondingly the channel redetection unit 51 is configured to redetect the MCCH when the determination unit determines that the notification does not carry all the changed contents carried on the MCCH.

In summary the invention offers the following advantageous effects:

In the solution according to the embodiments of the invention, a base station determines a change of contents carried on a configured MCCH and transmits a notification about the change of the contents carried on the MCCH to a user equipment on a PDCCH, and after receiving the notification about the change of the contents carried on the MCCH transmitted from the base station on the PDCCH, the user equipment redetects the MCCH according to the received notification. The base station notifies the user equipment about the change of the contents carried on the MCCH so that the UE can be aware of whether the contents carried on the MCCH is changed and redetect the MCCH only if there is a change instead of redirecting the MCCH periodically, thereby avoiding unnecessary listening of the UE to the MCCH and facilitating conservation of a resource required for the user equipment to listening to the channel.

Evidently those skilled in the art can make various modifications and variations to the invention without departing from the scope of the invention. Thus the invention is also intended to encompass these modifications and variations thereto as long as the modifications and variations come into the scope of the claims appended to the invention and their equivalents.

What is claimed is:

1. A channel content change notification method, comprising:
   a base station determining whether contents carried on a configured Multimedia Broadcast and Multicast Service, MBMS, point-to-multipoint Control Channel, MCCH, or MCCHs are changed; and
   the base station transmitting a notification about a change of the contents carried on the MCCH or MCCHs to a user equipment on a Physical Downlink Control Channel, PDCCH,
   wherein the base station transmitting the notification about the change of the contents carried on the MCCH or MCCHs to the user equipment on the PDCCH comprises
   the base station generating first Downlink Control Information, DCI, to notify about the change of the contents carried on the MCCH or MCCHs;
   scrambling the first DCI with a predefined first Radio Network Temporary Identifier, RNTI, corresponding to the first DCI; and
   transmitting the scrambled first DCI to the user equipment on the PDCCH,
   and wherein the base station generating the first DCI comprises
   A. the base station selecting one of preset lengths of bits, and generating a DCI with the bit length as the first DCI; or
   B. the base station selecting one of DCI formats already existing in a Long Term Evolution, LTE, system, and generating a DCI with the same bit length as the bit length of the DCI format as the first DCI.

2. The method of claim 1, wherein the base station transmitting the notification about the change of the contents carried on the MCCH or MCCHs to the user equipment on the PDCCH comprises:
   the base station generating second Downlink Control Information, DCI, corresponding to a cell-specific second Radio Network Temporary Identifier, RNTI, in a Long Term Evolution, LTE, system;
   scrambling the second DCI with a predefined first RNTI and the second RNTI; and
   transmitting the scrambled second DCI to the user equipment on the PDCCH.

3. The method of claim 1, wherein
   the operation A comprises the base station selecting one of preset lengths of bits according to the number of MCCH or MCCHs or both the number of MCCH or MCCHs and the changed contents carried on the MCCH or MCCHs, and generating a DCI with the bit length as the first DCI; or
   the operation B comprises the base station selecting one of DCI formats already existing in a Long Term Evolution, LTE, system according to the number of MCCH or MCCHs or both the number of MCCH or MCCHs and the changed contents carried on the MCCH or MCCHs, and generating a DCI with the same bit length as the bit length of the DCI format as the first DCI.

4. The method of claim 3, wherein the operation A comprises:
   generating a DCI with a 1-bit length as the first DCI when the MCCH or MCCHs is one MCCH; or
   generating a DCI with a bit length, which is not less than a bit length required to represent the changed carried contents, as the first DCI when the MCCH or MCCHs is one MCCH and the changed contents carried on the MCCH are carried in the first DCI; or generating a DCI with an N-bit length as the first DCI when the MCCH or MCCHs are multiple MCCHs; and for each of the MCCHs, setting the value of the corresponding bit in the first DCI to the MCCH to data indicating the change of the contents carried on the MCCH, wherein N is the number of MCCHs comprised in a cell covered by the base station; or generating a DCI comprising a number N of data segments as the first DCI when the MCCH or MCCHs are multiple MCCHs and the changed contents carried on the MCCHs are carried in the first DCI; and for each of the MCCHs, setting the value of a set bit in the corresponding data segment in the first DCI to the MCCH to data indicating the change of the contents carried on the MCCH, and carrying the changed contents carried on the MCCH in the other bits in the data segment.

5. The method of claim 3, wherein the operation B comprises:

selecting a DCI format already existing in the LTE system with the least bit length, and generating a DCI with the same bit length as the bit length of the DCI format as the first DCI when the MCCH or MCCHs is one MCCH; or selecting a DCI format already existing in the LTE system with a bit length which is not less than a bit length required to represent the changed carried contents, generating a DCI with the same bit length as the bit length of the DCI format as the first DIC, and carrying the changed contents carried on the MCCH in the first DCI when the MCCH or MCCHs is one MCCH and the changed contents carried on the MCCH are carried in the first DCI; or selecting a DCI format already existing in the LTE system with a bit length which is not less than N bits, and generating a DCI with the same bit length as the bit length of the DCI format as the first DCI when the MCCH or MCCHs are multiple MCCHs; and for each of the MCCHs, setting the value of the corresponding bit in the first DCI to the MCCH to data indicating the change of the contents carried on the MCCH, wherein N is the number of MCCHs comprised in a cell covered by the base station; or selecting a DCI format already existing in the LTE system with a bit length which is not less than the bit length of a number N of data segments, and generating a DCI with the same bit length as the bit length of the DCI format as the first DCI when the MCCH or MCCHs are multiple MCCHs and the changed contents carried on the MCCHs are carried in the first DCI; and for each of the MCCHs, setting the value of a set bit in the corresponding data segment in the first DCI to the MCCH to data indicating the change of the contents carried on the MCCH, and carrying the changed contents carried on the MCCH in the other bits in the data segment.

6. The method of claim 2, wherein the scrambling the second DCI with the first RNTI and the second RNTI comprises:

performing a mathematical operation on the first RNTI and the second RNTI to derive a third RNTI, and scrambling the second DCI with the third RNTI; or scrambling the second DCI once respectively with the first RNTI and the second RNTI; and wherein, the base station reserves the third RNTI instead of allocating the third RNTI to any user equipment for use.

7. A channel redetection method, comprising:

a user equipment receiving a notification about a change of contents carried on an Multimedia Broadcast and Multicast Service, MBMS, point-to-multipoint Control Channel, MCCH, transmitted from a base station on a Physical Downlink Control Channel, PDCCH; and the user equipment redetecting the MCCH according to the notification, wherein the user equipment receiving the notification about the change of the contents carried on the MCCH transmitted from the base station on the PDCCH comprises the user equipment receiving a Downlink Control Information, DCI, on the PDCCH; and detecting whether a Radio Network Temporary Identifier, RNTI, used for scrambling the DCI is a first RNTI, and if so, then determining the DCI is a first DCI to notify about the change of the contents carried on the MCCH, wherein the first RNTI is a predefined RNTI corresponding to the first DCI, wherein the first DCI is generated by the base station specifically as follows:

selecting one of preset lengths of bits, and generating a DCI with the bit length as the first DCI; or selecting one of DCI formats already existing in a Long Term Evolution, LTE, system, and generating a DCI with the same bit length as the bit length of the DCI format as the first DCI.

8. The method of claim 7, wherein the user equipment receiving the notification about the change of the contents carried on the MCCH transmitted from the base station on the PDCCH comprises:

the user equipment receiving a DCI on the PDCCH; and detecting whether the DCI is scrambled with the first RNTI and a cell-specific RNTI in a Long Term Evolution, LTE, system, and if so, then determining that the DCI is a second DCI corresponding to a second RNTI and taking the second DCI as notification signaling for the change of the contents carried on the MCCH.

9. The method of claim 8, wherein the detecting whether the DCI is scrambled with the first RNTI and the second RNTI comprises:

determining whether the RNTI used for scrambling the DCI is a third RNTI which is an RNTI resulting from a mathematical operation on the first RNTI and the second RNTI, and if so, then determining that the DCI is scrambled with the first RNTI and the second RNTI; or determining whether the DCI is scrambled once respectively with the first RNTI and the second RNTI, and if so, then determining that the DCI is scrambled with the first RNTI and the second RNTI.

10. The method of claim 8, wherein the user equipment redetecting the MCCH according to the notification comprises:

determining an MCCH identifier corresponding to the time that the first DCI or the second DCI is received according to a preset first correspondence relationship between notification transmission times and MCCH identifiers, and redetecting the MCCH corresponding to the MCCH identifier; or determining an MCCH identifier corresponding to the RNTI used for scrambling the first DCI or the second DCI according to a preset second correspondence relationship between RNTIs and MCCH identifiers, and redetecting the MCCH corresponding to the MCCH identifier; or determining an MCCH identifier corresponding to the location of a bit with a set value in the first DCI according to a preset third correspondence relationship between locations of bits and MCCH identifiers, and redetecting the MCCH corresponding to the MCCH identifier; or for each data segment comprised in the first DCI, determining an MCCH identifier corresponding to the location of the data segment according to a preset forth correspondence relationship between locations of data segments and MCCH identifiers if the value of a set bit in the data segment is a set value, and redetecting the MCCH corresponding to the MCCH identifier.

11. The method of claim 7, further comprising: before the user equipment redetects the MCCH according to the notification, the user equipment determining whether the notification carries all the changed contents carried on the MCCH.

12. A base station, comprising:

a change determination unit configured to determine whether contents carried on a configured Multimedia Broadcast and Multicast Service, MBMS, point-to-multipoint Control Channel, MCCH, are changed; and a change notification unit configured to transmit a notification about a change of the contents carried on the MCCH to a user equipment on a Physical Downlink Control Channel, PDCCH, after the change determination unit determines the change of the contents carried on the MCCH, wherein the change notification unit comprises a first signaling generation unit configured to generate first Downlink Control Information, DCI, to notify about the change of the contents carried on the MCCH;

a first signaling scrambling unit configured to scramble the first DCI with a predefined first Radio Network Temporary Identifier, RNTI, corresponding to the first DCI; and a first signaling transmission unit configured to transmit the first DCI scrambled by the first signaling scrambling unit to the user equipment on the PDCCH, wherein the first signaling generation unit is specifically configured to select one of preset lengths of bits and generate a DCI with the bit length as the first DCI; or to select one of DCI formats already existing in a Long Term Evolution, LTE, system and generate a DCI with the same bit length as the bit length of the DCI format as the first DCI.

13. The base station of claim 12, wherein the change notification unit comprises:

a second signaling generation unit configured to generate second Downlink Control Information, DCI, corresponding to a cell-specific second Radio Network Temporary Identifier, RNTI, in a Long Term Evolution, LTE, system;

a second signaling scrambling unit configured to scramble the second DCI with a predefined first RNTI and the second RNTI; and a second signaling transmission unit configured to transmit the second DCI scrambled by the second signaling scrambling unit to the user equipment on the PDCCH.

14. The base station of claim 13, wherein the second signaling scrambling unit comprises:

a mathematical scrambling unit configured to perform a mathematical operation on the first RNTI and the second RNTI to derive a third RNTI and to scramble the second DCI with the third RNTI; and a serial scrambling unit configured to scramble the second DCI once respectively with the first RNTI and the second RNTI.

15. A user equipment, comprising:

a change notification reception unit configured to receive a notification about a change of contents carried on an Multimedia Broadcast and Multicast Service, MBMS, point-to-multipoint Control Channel, MCCH, transmitted from a base station on a Physical Downlink Control Channel, PDCCH; and a channel redetection unit configured to redetect the MCCH according to the notification, wherein the change notification reception unit comprises a signaling reception unit configured for the user equipment to receive a Downlink Control Information, DCI, on the PDCCH; and a scrambling detection unit configured to detect whether a Radio Network Temporary Identifier, RNTI, used for scrambling the DCI is a first Radio Network Temporary Identifier, RNTI, and if so, then determine that the DCI is a first DCI to notify about the change of the contents carried on the MCCH, wherein the first RNTI is a predefined RNTI corresponding to the first DCI, wherein the first DCI is generated by the base station, and specifically the base station is configured to select one of preset lengths of bits and generate a DCI with the bit length as the first DCI; or to select one of DCI formats already existing in a Long Term Evolution, LTE, system and generate a DCI with the same bit length as the bit length of the DCI format as the first DCI.

16. The user equipment of claim 15, wherein the scrambling detection unit is further configured to detect whether the DCI is scrambled with the first RNTI and a cell-specific RNTI in a Long Term Evolution, LTE, system, and if so, then determine that the DCI is a second DCI corresponding to a second RNTI and take the second DCI as notification signaling for the change of the contents carried on the MCCH.

17. The user equipment of claim 16, wherein the scrambling detection unit comprises:

a first detection unit configured to determine whether the RNTI used for scrambling the DCI is a third RNTI which is an RNTI resulting from a mathematical operation on the first RNTI and the second RNTI, and if so, then determine that the DCI is scrambled with the first RNTI and the second RNTI; and a second detection unit configured to determine whether the DCI is scrambled once respectively with the first RNTI and the second RNTI, and if so, then determine that the DCI is scrambled with the first RNTI and the second RNTI.

18. The user equipment of claim 15, further comprising:

a determination unit configured to determine whether the notification carries all the changed contents carried on the MCCH; and wherein, the channel redetection unit is configured to redetect the MCCH when the determination unit determines that the notification does not carry all the changed contents carried on the MCCH.

19. The method of claim 11, wherein redetecting the MCCH according to the notification comprises:

the user equipment redetecting the MCCH upon determining that the notification does not carry all the changed contents carried on the MCCH.

* * * * *